US012698645B2

(12) United States Patent
Minsley et al.

(10) Patent No.: US 12,698,645 B2
(45) Date of Patent: Aug. 4, 2026

(54) CYLINDER LOCK

(71) Applicant: DAVINCI LOCK LLC, Raleigh, NC (US)

(72) Inventors: Bradford A. Minsley, Raleigh, NC (US); Clifton P. Minsley, Raleigh, NC (US)

(73) Assignee: DAVINCI LOCK LLC, Raleigh, NC (US)

( * ) Notice: Subject to any disclaimer, the term of this patent is extended or adjusted under 35 U.S.C. 154(b) by 0 days.

(21) Appl. No.: 19/348,188

(22) Filed: Oct. 2, 2025

(65) Prior Publication Data

US 2026/0055642 A1 Feb. 26, 2026

Related U.S. Application Data

(63) Continuation-in-part of application No. 19/308,590, filed on Aug. 25, 2025.

(Continued)

(51) Int. Cl.
*E05B 13/10* (2006.01)
*E05B 65/08* (2006.01)

(52) U.S. Cl.
CPC ........ *E05B 13/108* (2013.01); *E05B 65/0894* (2013.01)

(58) Field of Classification Search
CPC .... E05B 5/003; E05B 13/108; E05B 27/0003; E05B 27/0046; E05B 37/02; E05B 65/0894
See application file for complete search history.

(56) References Cited

U.S. PATENT DOCUMENTS 1,640,935 A 8/1927 Hatch
1,951,418 A * 3/1934 Jacobi .................... E05B 29/00
292/DIG. 37

(Continued)

FOREIGN PATENT DOCUMENTS

ES 1294372 U 9/2022
GB 2496911 B 9/2017
WO 2020/183046 A1 9/2020

OTHER PUBLICATIONS

U.S. Patent and Trademark Office, Office Action, U.S. Appl. No. 19/308,590, Nov. 25, 2025.

(Continued)

*Primary Examiner* — Christopher J Boswell
(74) *Attorney, Agent, or Firm* — Williams Mullen; Thomas F. Bergert

(57) ABSTRACT

Embodiments of a cylinder lock include a cylinder lock case provided with a hollow interior. A knob key assembly is integrally formed with or secured to a spindle and maintained within the interior of the cylinder lock case. The knob key assembly includes a knob at one end and a locking element head at the other end. Embodiments of the knob key assembly further include a head nestable within a cradle of the spindle, wherein openings in the head and the cradle are aligned and are further alignable with a lateral opening in the cylinder lock case. Rotation of the knob permits the openings in the head and the cradle to come into or out of alignment with the opening in the cylinder lock case, while also rotating the locking element head between a first position where it can be removed from a lock structure and a second position where it cannot be removed.

18 Claims, 7 Drawing Sheets

Related U.S. Application Data

(60) Provisional application No. 63/686,346, filed on Aug. 23, 2024.

(56) References Cited

U.S. PATENT DOCUMENTS

| | | | | | |
|---|---|---|---|---|---|
| 2,046,831 | A | | 7/1936 | Lowe | |
| 3,659,444 | A | * | 5/1972 | Wellekens | E05B 17/04 70/386 |
| 3,916,657 | A | | 11/1975 | Steinbach | |
| 3,919,866 | A | | 11/1975 | Lipschutz | |
| 4,112,820 | A | | 9/1978 | Conger et al. | |
| 4,688,405 | A | | 8/1987 | Epstein | |
| 5,119,649 | A | | 6/1992 | Spence | |
| 5,586,459 | A | * | 12/1996 | Bullock | E05B 13/108 70/216 |
| 5,722,275 | A | | 3/1998 | Price | |
| 5,724,840 | A | | 3/1998 | DiVito | |
| 5,921,119 | A | * | 7/1999 | Myers | E05B 5/003 74/528 |
| 5,931,032 | A | | 8/1999 | Gregory | |
| 6,098,434 | A | * | 8/2000 | Liou | B60R 25/086 70/360 |
| 6,257,029 | B1 | | 7/2001 | Liao | |
| 6,477,872 | B1 | | 11/2002 | Denton | |
| 6,758,069 | B2 | | 7/2004 | Derman | |
| 6,880,373 | B2 | | 4/2005 | Ling | |
| 7,234,326 | B1 | | 6/2007 | Lu | |
| 7,444,844 | B1 | | 11/2008 | Lee | |
| 7,958,757 | B1 | | 6/2011 | Lee | |
| 8,171,762 | B2 | | 5/2012 | Hsiao | |
| 8,316,675 | B2 | * | 11/2012 | Yang | E05B 13/106 70/284 |
| 8,474,290 | B2 | * | 7/2013 | Terhaar | E05B 83/26 292/DIG. 43 |
| 9,222,283 | B1 | | 12/2015 | Zhang | |
| 9,260,883 | B2 | * | 2/2016 | Räty | E05B 5/003 |
| 10,669,746 | B2 | | 6/2020 | Nguyen | |
| 10,851,563 | B1 | | 12/2020 | Zhang | |
| 11,131,119 | B2 | | 9/2021 | Hwang | |
| 11,913,250 | B2 | * | 2/2024 | Lee | E05B 19/0047 |
| 12,044,037 | B2 | * | 7/2024 | Xiang | E05B 15/00 |
| 12,305,421 | B2 | | 5/2025 | Pollnow | |
| 2008/0289379 | A1 | | 11/2008 | Martin | |
| 2018/0258667 | A1 | | 9/2018 | Lehner, Jr. et al. | |
| 2022/0243499 | A1 | | 8/2022 | Wu | |
| 2023/0127631 | A1 | | 4/2023 | Li | |

OTHER PUBLICATIONS

U.S. Patent and Trademark Office, Office Action, U.S. Appl. No. 19/308,591, Nov. 25, 2025.

International Searching Authority, International Search Report and Written Opinion, International Application No. PCT/US2025/043349, Oct. 6, 2025.

International Searching Authority, International Search Report and Written Opinion, International Application No. PCT/US2025/043351, Oct. 14, 2025.

U.S. Patent and Trademark Office, Office Action, U.S. Appl. No. 19/308,591, Feb. 18, 2026.

* cited by examiner

FIG. 4
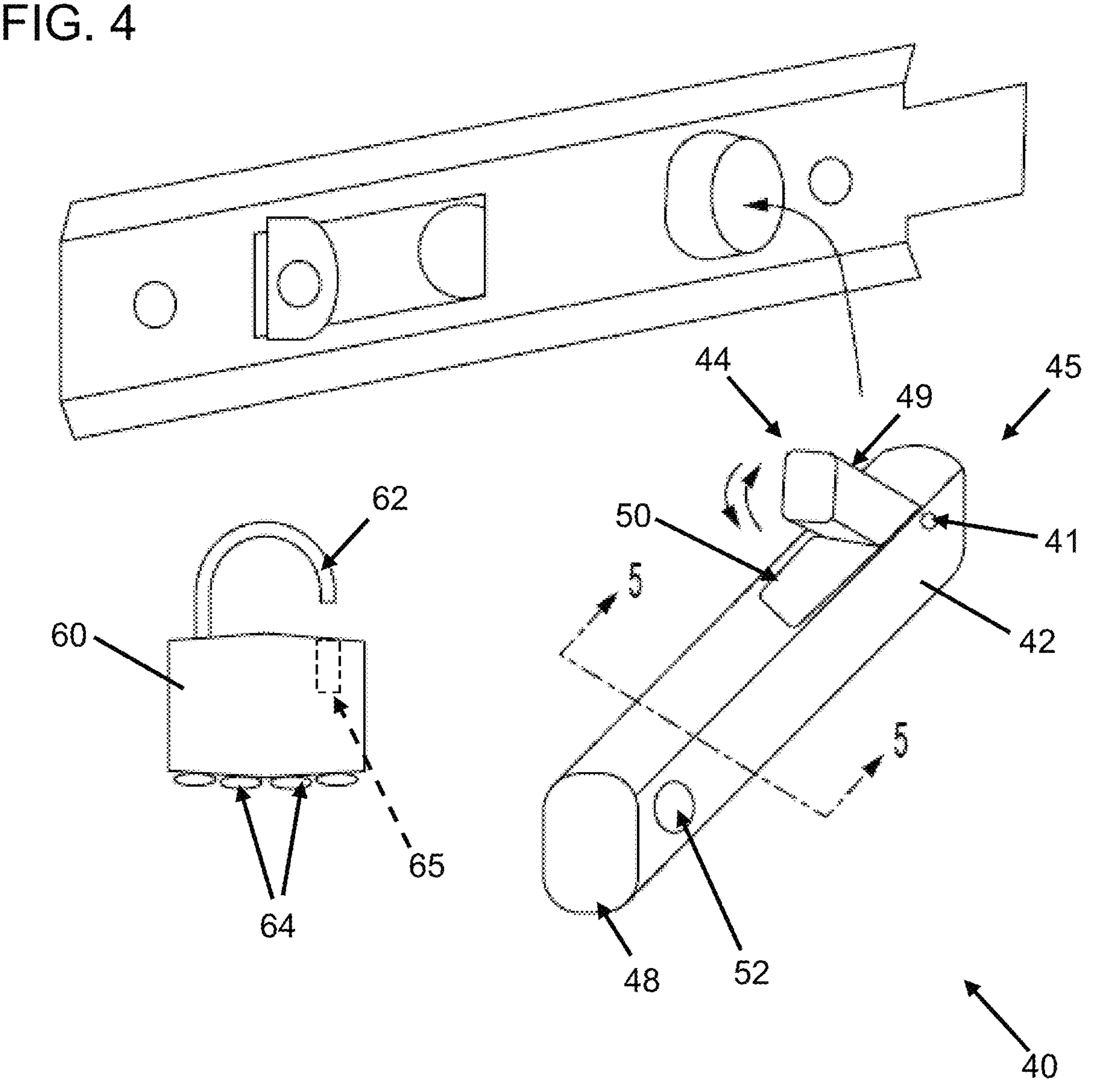
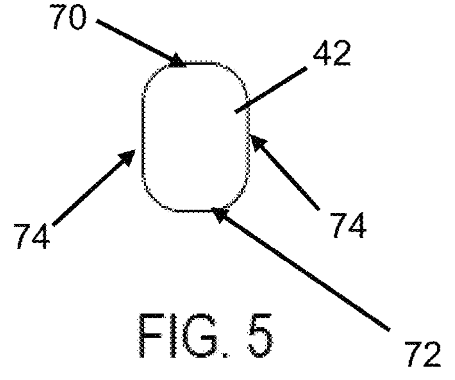
FIG. 5

FIG. 7
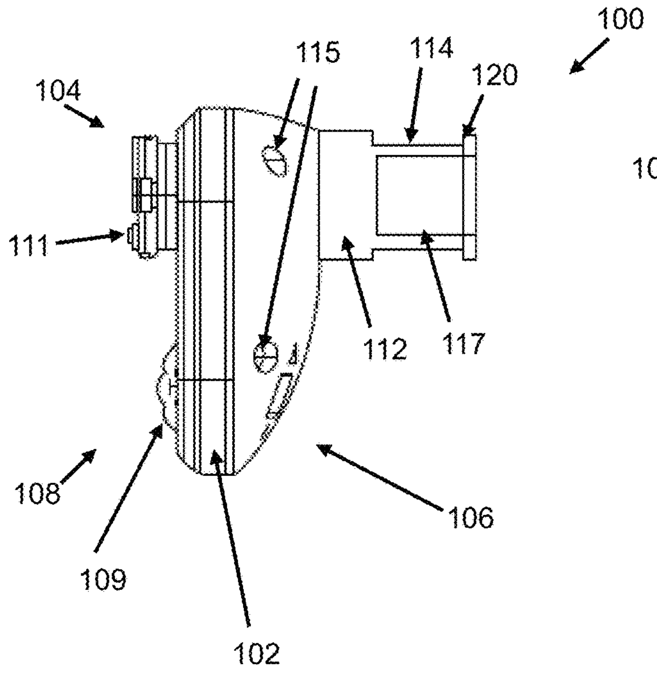
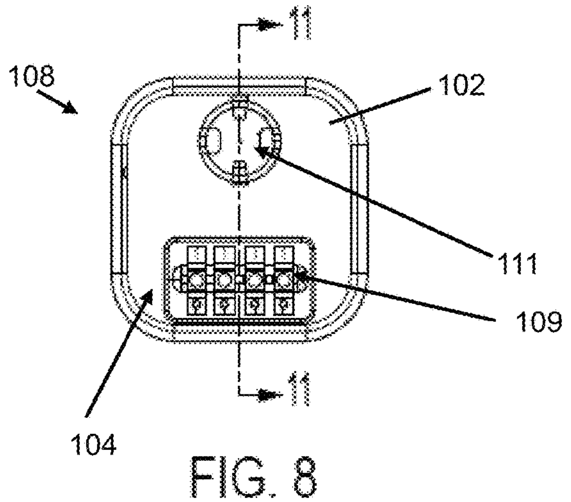
FIG. 8
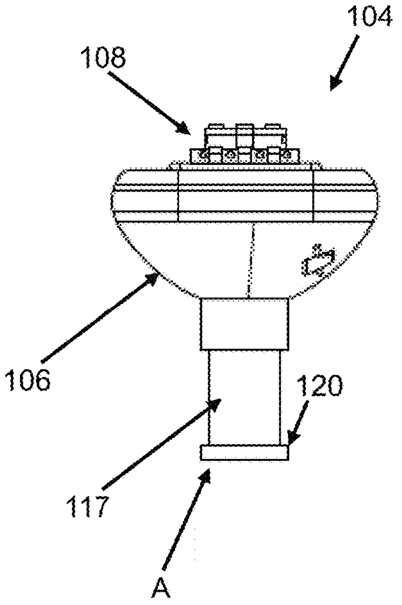
FIG. 9
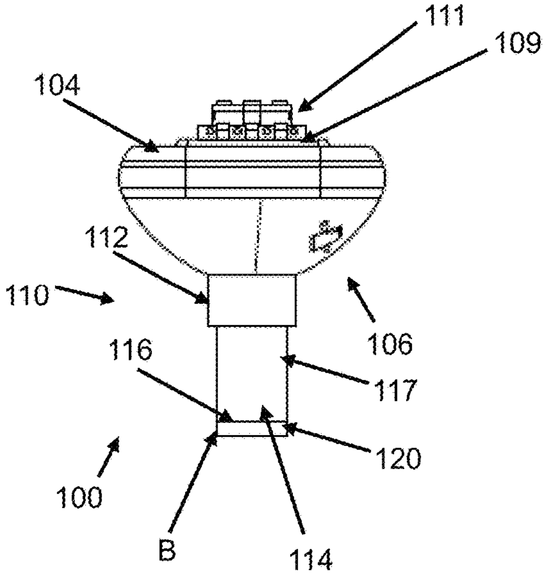
FIG. 10

CYLINDER LOCK

CROSS-REFERENCE TO RELATED APPLICATIONS

This application is a continuation-in-part application of U.S. patent application Ser. No. 19/308,590 filed on Aug. 25, 2025, which claims priority to U.S. Provisional Ser. No. 63/686,346 filed on Aug. 23, 2024, the contents of all of which are incorporated by reference herein in their entireties.

BACKGROUND AND SUMMARY

Door locks come in a variety of shapes and sizes. Certain doors such as storage facility doors may be provided with a bolt latch having an opening when in a lockable position for the insertion of a cylinder lock. In some cases, it is desirable to employ a padlock or other lock with such door locks without having to modify the door lock structure.

Embodiments of the present disclosure provide a cylinder lock and lock adapter that permit the use of a padlock or other lock in circumstances such as above without having to modify the door lock structure. Embodiments as described herein provide a cylinder lock with a main body component and an extension component, wherein a locking arrangement can be employed to move a locking element at the back of the extension component to lock or unlock the extension component from a lock structure having a latch or hasp maintained within a plate frame. Embodiments of the present disclosure further provide a cylinder lock with a lock adapter having a body and a biased catching mechanism operable to fit within the body near a back end of the lock adapter when in the retracted position and further operable to extend outwardly of the lock adapter body when in the extended position. The catching mechanism can be biased in the extended position and movable to the retracted position by a plunger. The plunger can be moved manually and can be locked in position using a lock such as a padlock with a shackle.

BRIEF DESCRIPTION OF THE DRAWINGS

FIG. 4 is a front perspective view of a lock structure with an exemplary lock adapter according to embodiments of the present disclosure, prior to insertion of the lock adapter in the lock structure.

FIG. 5 is a cross-sectional view of the lock adapter taken along the line A-A of FIG. 4.

FIG. 7 is a left side view of a cylinder lock according to embodiments of the present disclosure.

FIG. 8 is a front view of the cylinder lock of FIG. 7.

FIG. 9 is a bottom view of the cylinder lock of FIG. 7, showing a movable locking element in the locked position.

FIG. 10 is a bottom view of the cylinder lock of FIG. 7, showing a movable locking element in the unlocked position.

DETAILED DESCRIPTION OF EMBODIMENTS

Figure 1:
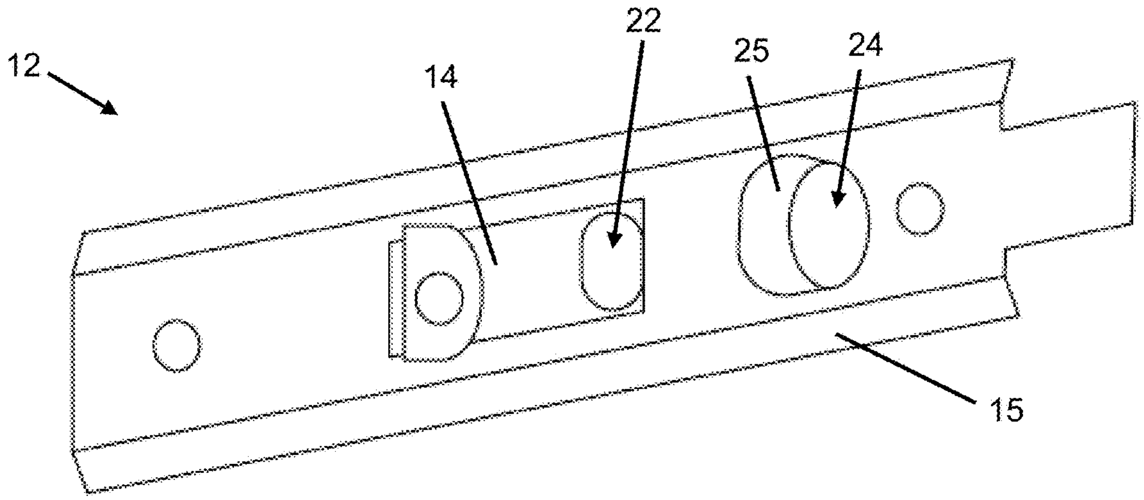
FIG. 1 is a front perspective view of a lock structure.
Figure 2:
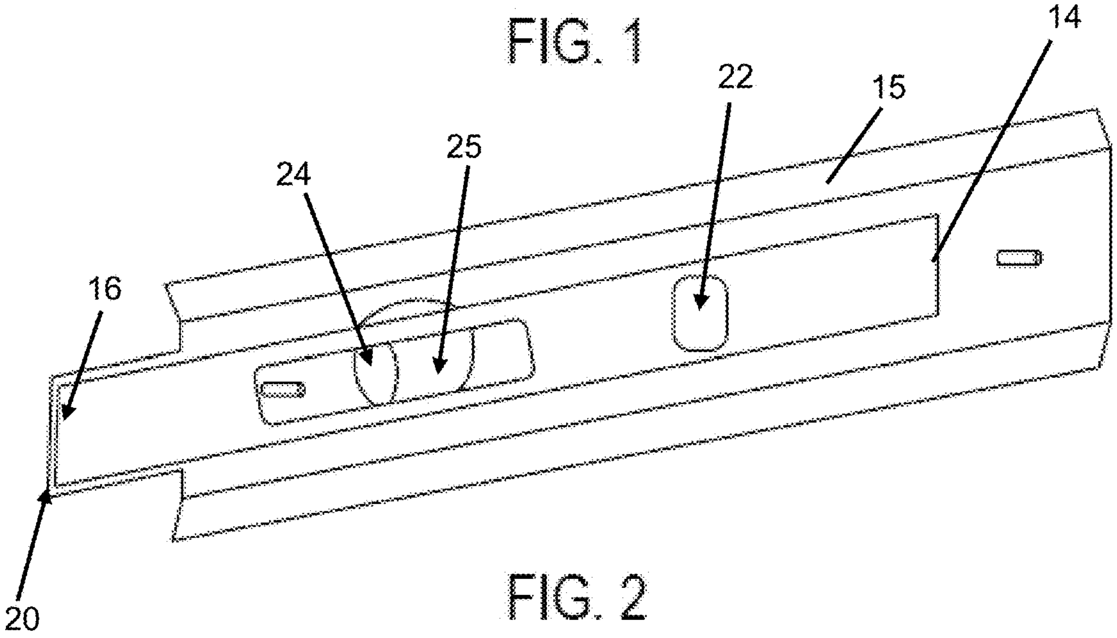
FIG. 2 is a rear perspective view of the lock structure of FIG. 1.
Figure 3:
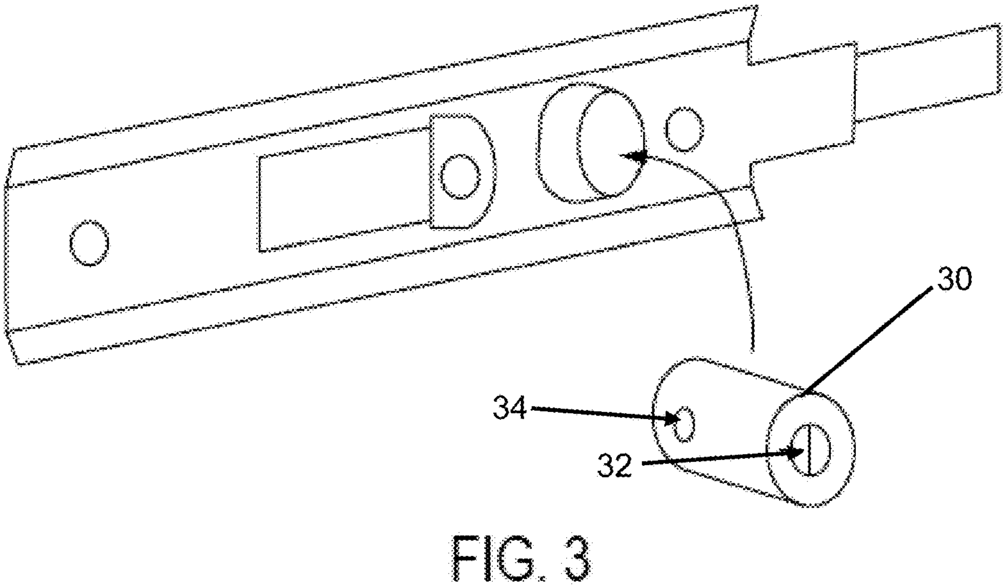
FIG. 3 is a front perspective view of the lock structure of FIG. 1 in a lockable position and with an exemplary cylinder lock prior to insertion of the cylinder lock in the lock structure.

As shown in FIGS. 1 through 3, a lock structure 12 is provided with a latch or hasp 14 maintained within a plate frame 15. The hasp 14 can be slid between a lockable position and an unlockable position. In the lockable position, one end 16 of the hasp 14 slides beyond the end wall 20 of the plate frame 15 and into a mating slot in a door frame, wall or external structure (not shown) adjacent to the plate frame 15. In the lockable position, an opening 22 in the hasp 14 is aligned with an opening 24 in the plate frame 15. Opening 24 can be provided as part of a cylindrically or other shaped extension 25 from the plate frame 15, as will be appreciated by one of ordinary skill. When the hasp 14 is slid back to the unlockable position, the opening 22 in the hasp 14 is not aligned with the opening 24 in the plate frame 15, and therefore the door to which this lock structure 12 is provided cannot be locked.

In the lockable position as shown in FIG. 3, a cylinder lock 30 can be inserted into the openings 22, 24 in the plate frame 15 and the hasp 14. The cylinder lock 30 can have a keyed groove 32 which can receive an external key (not shown). When the key is in the groove of the cylinder lock 30, the key can be turned to lock the cylinder lock 30 in place within the openings 22, 24 of the hasp 14 and plate frame 15 via a detent 34 or other locking mechanism on the cylinder lock 30 engaging an internal part of the lock structure 12. The locking of the cylinder lock 30 effectively maintains the hasp 14 in the locked position where it cannot be moved. The key can then be removed with the cylinder lock 30 left in place in the lock structure 12. When a user desires to open the lock, the key is inserted into the key groove and turned to release the cylinder lock 30 from the openings 22, 24. With the cylinder lock removed, the hasp 14 can be slid to allow the door to be opened.

In many environments, it is desirable to continue to employ the locking structure as in FIG. 1, but with a different type of lock. However, locks such as padlocks cannot be directly employed in the environment of FIGS. 1 through 3 because the geometries of the hasp 14, plate frame 15 and openings 22, 24 do not permit a shackle from a padlock to fit through the opening and securely engage the opening on the padlock body according to traditional padlock operation.

Figure 6:
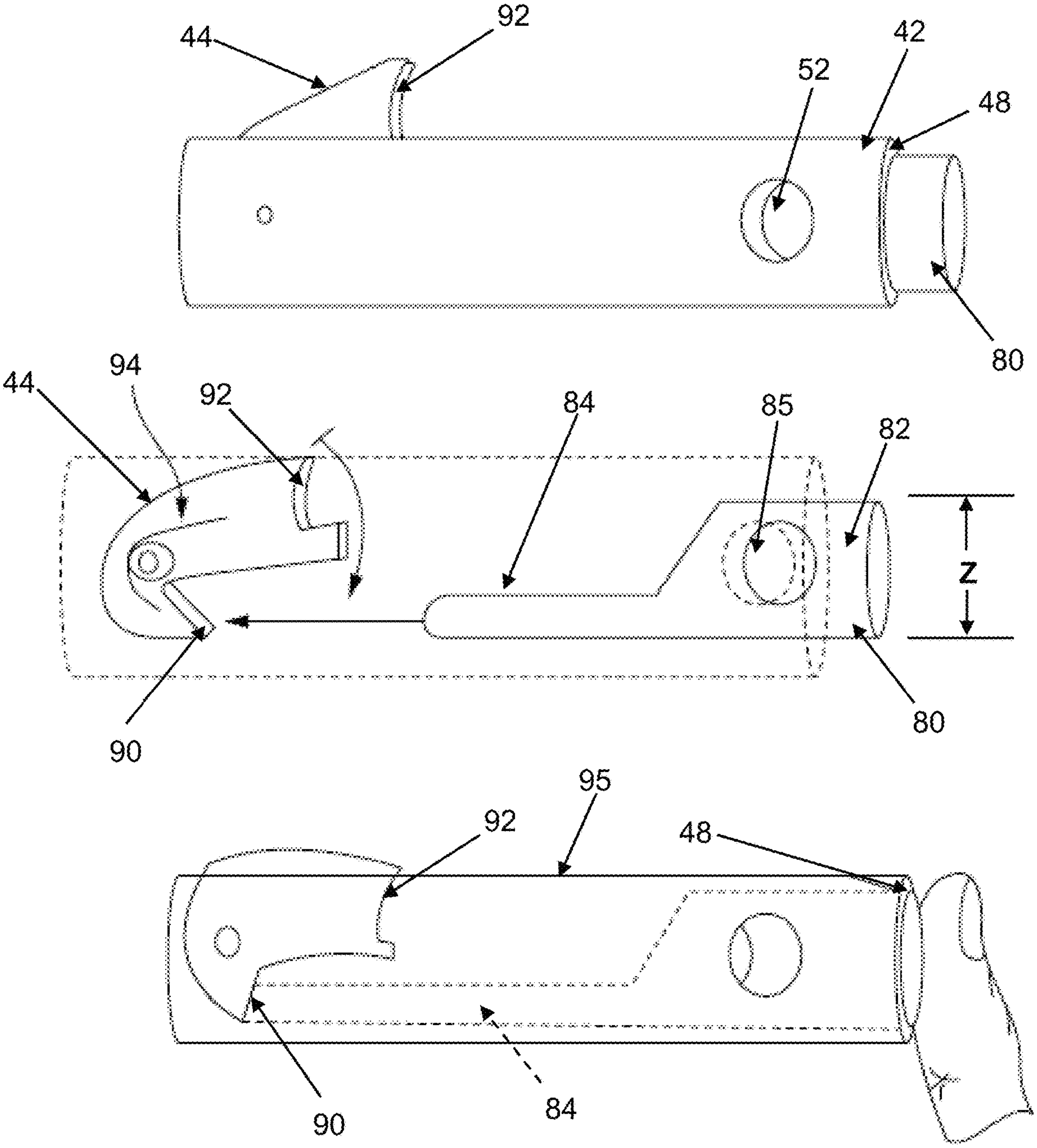
FIG. 6 is a series of perspective drawings showing a plunger and operation thereof in accordance with embodiments of the present disclosure.

According to embodiments of the present disclosure, such as shown in FIG. 4, for example, a lock adapter 40 is provided with a body 42 and a biased catching mechanism 44 operable to fit within the body 42 of the lock adapter 40 near a back end 45 of the lock adapter 40 when in the retracted position and further operable to extend outwardly of the lock adapter body 42 when in the extended position. It will be appreciated that a spring 94 or other biasing mechanism can be employed to retain the catching mechanism 44 in the extended position at rest, such as shown in FIGS. 4 and 6. The spring 94 can be maintained in the hollow body 42 of the lock adapter 40 for biasing the catching mechanism 44 in the extended position. The spring 94 may be positioned below the extended portion 92 of the catching mechanism 44 or may be positioned behind the bottom surface 90 of the catching mechanism 44, for example. In various embodiments, such as shown in FIG. 6, the spring 94 is maintained as a wound coil within the catching mechanism 44.

The catching mechanism 44 can be pivotably secured by a screw 41 or similar device at the back end 45 of the lock adapter body 42 adjacent an aperture or opening 50 formed in the lock adapter body 42, wherein the aperture 50 is aligned with an opening extending through the catching mechanism 44, which permits the catching mechanism 44 to pivot back and forth during operation as described herein. The lock adapter body 42 can further be formed with an aperture 52 extending radially through the body 42 proximate a front end 48 of the lock adapter body 42. The aperture 52 is operable to receive a shackle such as a shackle 62 on a padlock 60. The padlock can be a combination lock with combination rollers 64 according to padlock designs known in the art.

In addition to the above, the lock adapter body 42 can be formed so as to be insertable through the hasp opening 22 and the plate frame opening 24 of a lock structure as indicated by the arrow in FIG. 4, for example. In various embodiments, the lock adapter body 42 is slidingly engageable with the lock structure 12 and fits through the openings 22, 24 when the lock structure is in the lockable position. It will be appreciated that the cross-sectional profile of the lock adapter body 42 can be round, oval or another shape in order to sufficiently fit through the opening(s) in the environment where operated. In various embodiments, the cross-sectional profile is rounded at top 70 and bottom 72 surfaces and substantially linear at the side surfaces 74, as shown in FIG. 5, for example. Such shape can be referred to as an elliptical cylindrical shape. The lock adapter body 42 can be hollow in one or more segments, such as at least in the part 50 which retains the catching mechanism 44. The lock adapter body 42 can further be formed as a solid body other than the segment which receives the catching mechanism 44 and other than the aperture 52.

In operation, once a hasp in a lock structure such as hasp 14 in lock structure 12 is slid into the lockable position with the hasp opening 22 aligned with the plate opening 24, the back end 45 of the lock adapter 40 can be inserted through the openings 22, 24. As the lock adapter 40 is inserted into the openings 22, 24, the walls defining the openings 22, 24 engage the back/top (indicated at 49 in FIG. 4) of the catching mechanism 44, influencing the catching mechanism 44 against its bias and into a position within the cavity 50 of the lock adapter body 42, thereby permitting the catching mechanism 44 to be fully inserted through the openings 22, 24. Once the catching mechanism 44 is inserted through the wall surrounding the openings 22, 24, the catching mechanism 44 springs back to its resting position extended from the body 42 of the lock adapter 40. In this position, the lock adapter 40 is maintained in position against the back of the hasp 14 and/or plate frame 15 and cannot be pulled back through the openings 22, 24. A shackle (e.g., 62) of an external lock (e.g., 60) can then be inserted through the aperture 52 in the front end 58 of the lock adapter 40 and secured within a shackle arm opening 65 of the external lock 60.

According to various embodiments as illustrated in FIG. 6, a plunger 80 can be provided and employed to facilitate manual retraction of the catching mechanism 44. Such manual retraction may be desirable, for example, when a user wishes to retrieve the lock adapter 40 from its previously installed position and has removed any shackle of an external lock, such as shackle 62 of lock 60. In such embodiments, the lock adapter body 42 is hollow and retains the plunger 80 within a hollow cavity thereof. As shown in FIG. 6, the plunger 80 can be provided with a plunger body 82 and a plunger neck 84, with an opening 85 formed in the plunger body 82 to align with the aperture 52 in the lock adapter body 42. The plunger neck 84 is formed so as to be capable of engaging a bottom surface 90 of the catching mechanism 44 within the cavity of the lock adapter body 42. For example, the plunger neck 84 can be formed with a radial thickness Y that is one-half or less than the radial thickness Z of the plunger body 86, so as to permit operation as disclosed herein. The geometric shape of the catching mechanism 44 can vary but as shown in FIG. 6, it includes the bottom surface 90 which may optionally be angled such that, when the plunger 80 is depressed from the outside of the lock adapter body 42, the plunger 80 slides within the lock adapter body 40 and impacts the bottom surface 90 that faces the plunger neck 84. As the plunger 80 is depressed, the plunger neck 84 exerts a force on the bottom surface 90 of the catching mechanism 44 that causes the catching mechanism 44 to rotate about its axis and against its biased position as described earlier. The extended portion 92 of the catching mechanism 44 is then rotated downward and into the opening 50 of the lock adapter body 42 where it maintains a substantially flat position aligned with the top surface 95 of the lock adapter body 42. In such position, the lock adapter 40 can be pulled out by the operator through the hasp opening 22 and the plate frame opening 24. Releasing the plunger 80 allows the spring or other biasing mechanism to rotate the catching mechanism 44 upwards and push the plunger 80 back through the end 48 of the lock adapter body 42.

As shown in the embodiment of FIGS. 7 through 11, a cylinder lock 100 is provided with a main body component 102 having a front face 104 and a back face 106. A locking arrangement 108 is accessible via the front face 104 of the main body component 102. The locking arrangement 108 can include, for example, a combination dial and/or rollers 109 and a rotary knob 111 for engaging or disengaging a locking element in accordance with embodiments of the present disclosure. An extension component 110 is provided with a first end 112 extending from the back face 106 of the main body component 102 and a second end 114 opposite the first end 112, wherein the second end 114 has a rear surface 116. According to various embodiments, the extension component 110 is integrally formed with the main body component 102 and as such, the cylinder lock 100 in such embodiments is a monolithic device, which may be referred to herein as the main body component 102. In various embodiments, at least a portion of the extension component 110 can be formed with a cylindrical or elliptically cylindrical cross-section to facilitate entry through a similarly shaped opening in a plate frame as described elsewhere herein.

The back face 106 can also be integrally formed with the front face 104, or in various embodiments, can be secured such as with machine screws 115 or other attachment mechanisms. As further shown in FIGS. 7 through 11, a locking element 120 is secured such that a head 122 thereof is movable at a position outside of the main body component 102 and/or extension component 110 adjacent the second end 114 of the extension component 110. In various embodiments, the locking element 120 is secured to and/or adjacent the rear surface 116 of the second end 114 of the extension component 110. In various embodiments, the locking element 120 is formed with a hollowed cylindrical body 125, a hollowed cylindrical foot 127 and a head 122, wherein the body 125 and foot 127 are rotatable within a cylindrical cavity 150 of the extension component 110. The cylindrical body 125 and foot 127 can be formed as hollow with an internal cavity 128 for receiving a spindle 160. The spindle 160 can be secured within the cavity 128 at one end 162 and secured at a second end 164 of the spindle 160 within a cavity 170 of the knob 111. Securing of the spindle 160 can be via a fixed connection or by friction fit, for example. The locking element 120 can be maintained within the cavity 150 of extension component 110 via a fixed connection such as a screw with optional washer, wherein the screw threadedly engages a threaded opening accessible in the end 162 of the spindle 160. Alternatively, the locking element 120 can be maintained within the cavity 150 via friction fit. For example, cavity 150 can be formed with an axially outward section 151 and an axially inward section 152, wherein the axially outward section 151 has a smaller diameter than the diameter of the axially inward section 152. The foot 127 of locking element 120 can have a larger diameter than the body 125 of locking element 120, and the foot 127 can be rotatably maintained within the axially inward section 152 of the cavity 150 of the extension component 110 whereas the body 125 of locking element 120 can be rotatably maintained within the axially outward section 151 of the cavity 150 of the extension component 110. Further the head 122 of the locking element 120 can be provided with a diameter larger than the axially outward section 151 of the cavity 150. As such, the head 122 and foot 127 of the locking element 120 become locked in position and incapable of axially moving within or outside of the cavity 150 according to various embodiments of the present disclosure. Nevertheless, the locking element 120 is rotatable when the knob 111 is rotated due to the connection of the knob 111 and locking element 120 to the spindle 160.

Figure 11:
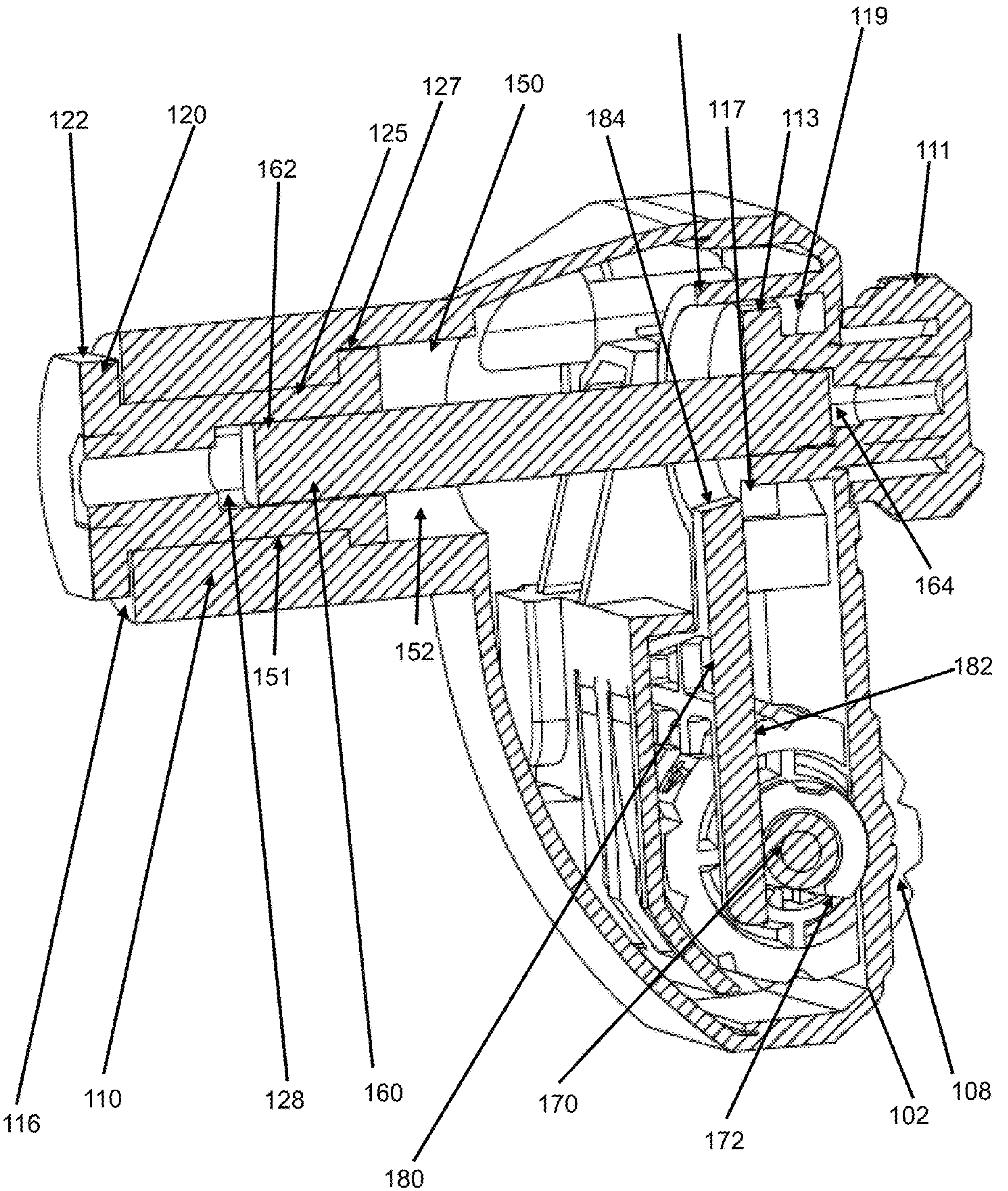
FIG. 11 is a perspective view of a cross-section of the cylinder lock taken along the line 11-11 of FIG. 8.

In various embodiments, the spindle 160 can be permitted to rotate or restricted from rotation due to engagement of the knob 111 and/or a cam 170 of the locking arrangement 108 with a control lever 180. The cam 170 and control lever 180 are maintained within the cavity of the main body component 102 and can both be considered part of the locking arrangement 180. As shown in FIG. 11, the cam 170 can be mechanically engaged with the locking arrangement 108 and can be formed with a flat edge 172. When the locking arrangement 108 is locked, the cam 170 is in a position where the flat edge 172 is in full mechanical communication with an interior face 182 of the control lever 180. In such position, the control lever 180 is free to slide within the hollowed body of the main body component 102 such that top end 184 of the control lever 180 is aligned with a leg 113 of knob 111. In such position, the notched segment 117 of the leg 113 of knob 111 engages the top end 184 of the control lever 180 such that the knob 111 is prevented from rotating, which prevents the spindle 160 from rotating, which in turn prevents the locking member 120 from rotating. Thus, when the locking arrangement 108 is locked, such as, for example, when the combination is not set to the proper combination for unlocking the lock, the knob 111 will not turn and thus the locking member 120 cannot rotate to a position which will permit unlocking of the lock. When the proper combination is input to the locking arrangement 108, the cam 170 is rotated so as to move the control lever 180 so as to disengage the notched segment 117 of the leg 113 of the knob 111, which permits the knob 111 to be rotated, thereby rotating the spindle 160 and locking member 120. It will be appreciated that the main body component 102 can be formed with a sleeve 118 defining a cavity 119 within which the knob leg 113 can rotate.

In various embodiments, at least the second end 114 of the extension component 110 has a cross-sectional shape of an elliptical cylinder, such as the shape shown in FIG. 5, including substantially flat or planar side surfaces 117. Further, the locking element 120 can be formed with the head 122 having a cross-sectional shape of an elliptical cylinder, such as the shape shown in FIG. 5. In this way, the movable locking element 120 can be moved from a position A in FIG. 9, where the locking element head 122 is not aligned with the second end 114 of the extension component 110 to a position B in FIG. 10, where the locking element head 122 is aligned with the second end 114 of the extension component 110. When in position B, the cylinder lock 100 including locking element 120 can be fully removed from a lock structure and/or hasp of a lock structure such as the lock structure 12 shown in FIGS. 1 through 3, whereas in position A, the locking element head 122 provides a catch for the back or internal part of a lock structure or hasp of a lock structure, thereby preventing removal of the cylinder lock 100 and locking element 120.

In various embodiments, the locking arrangement 108 is operable to move the locking element 120 from a locking position (e.g., position B in FIG. 10) to an unlocking position (e.g., position A in FIG. 9) and vice versa. For example, once the correct combination is input into the combination dial and/or rollers 109, the knob 111 can be rotated, thereby rotating internal components the spindle 160 within a cavity of the main body component 102 and extension component 110 of the cylinder lock 100, wherein the spindle 160 is part of or is connected to the locking element 120. If the correct combination is not used, the knob 111 can be locked in position and unable to move the locking element 120. It will be appreciated that movement of the rotatable knob 111 moves the locking element 120 either into or out of axial alignment with the second end 114 of the extension component 110.

In other embodiments of a cylinder lock 200 according to the present disclosure as shown in FIGS. 12 through 17, the main body component 102 and extension component 110 of a cylinder lock case 215 are connected or formed as a monolithic device with a hollow interior. The hollow interior is defined, at least in part, by the cylinder lock case 215, which is formed with a knob end 217 and a locking end 219. A rotating knob 190 extends outwardly of the main body component 102 as part of a knob key assembly 300 that also includes a knob key shoulder 252, a partly spherically shaped head cradle 240 and a locking element head 122. The knob key assembly 300 extends axially through a cavity (i.e., the hollow interior) of the cylinder lock case 215 along an axis. The partly spherically shaped head cradle 240 of the knob key assembly 300 can be provided with an opening 192 extending laterally therethrough that can be rotated into and out of alignment with a lateral opening 103 extending through the main body component 102 of the cylinder lock case 215. The knob 190 of the knob key assembly 300 is positioned at least partially outwardly of the knob end 217 of the cylinder lock case 215 and the locking element head 122 is positioned at least partially outwardly of the locking end 219 of the cylinder lock case 215.

Figure 12:
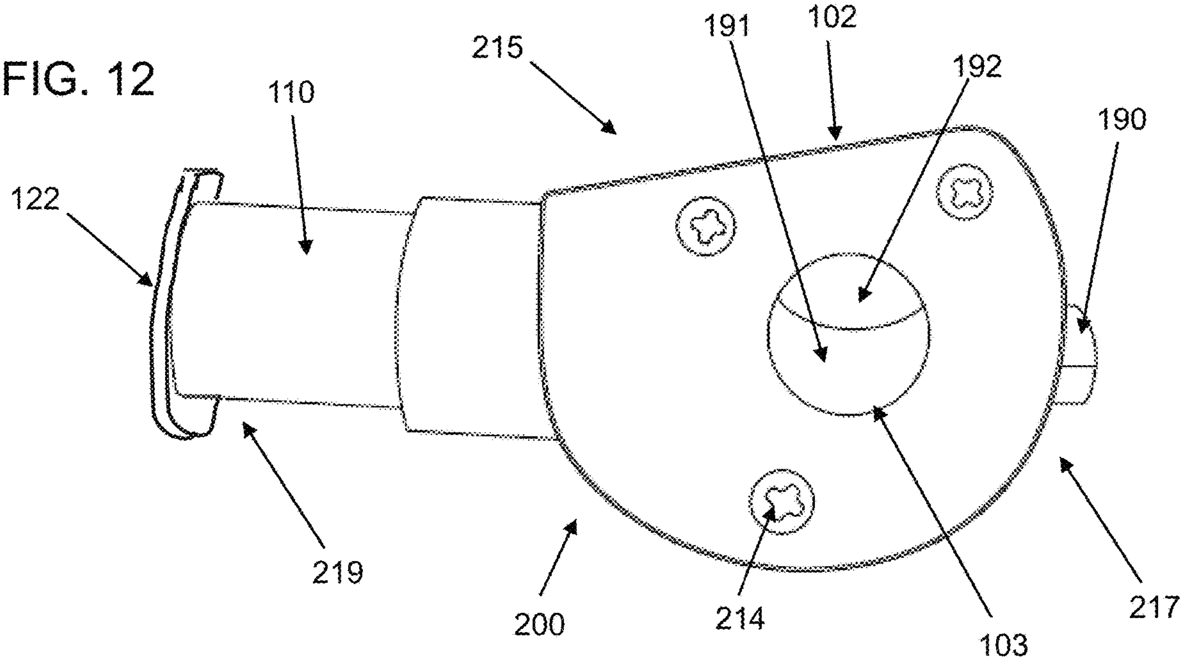
FIG. 12 is a right-side view of a cylinder lock according to embodiments of the present disclosure.
Figure 13:
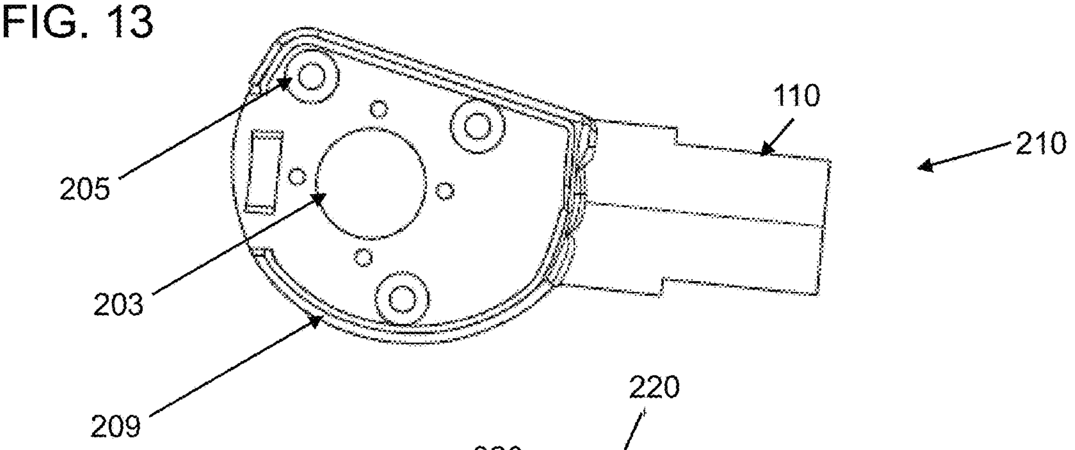
FIG. 13 is a left side view of a back portion of a cylinder lock case according to embodiments of the present disclosure.
Figure 14:
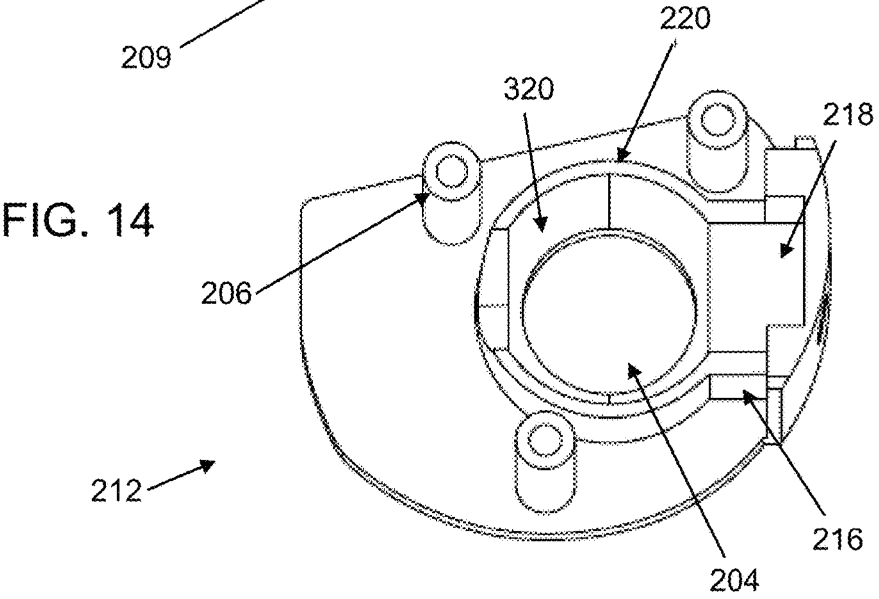
FIG. 14 is a right-side view of a front portion of a cylinder lock case according to embodiments of the present disclosure.

FIGS. 13 and 14 show mating portions 210, 212 of the cylinder lock case 215 as part of the main body component 102 for the cylinder lock 200 shown in FIG. 12. The left side case portion 210 can be formed with an opening 203 and the right-side case portion 212 can be formed with an opening 204. Together, the openings 203, 204 form the cylinder lock opening 103 in FIG. 12. In various embodiments, the left side case portion 210 is formed or provided with connector openings 205 that align with male connector openings 206 in the right-side case portion 212 when the case portions 210, 212 are mated after the spindle 191 has been inserted therebetween. In various embodiments, the case portions 210, 212 are secured together by screws 214 extending through the openings 205, 206.

Figure 15:
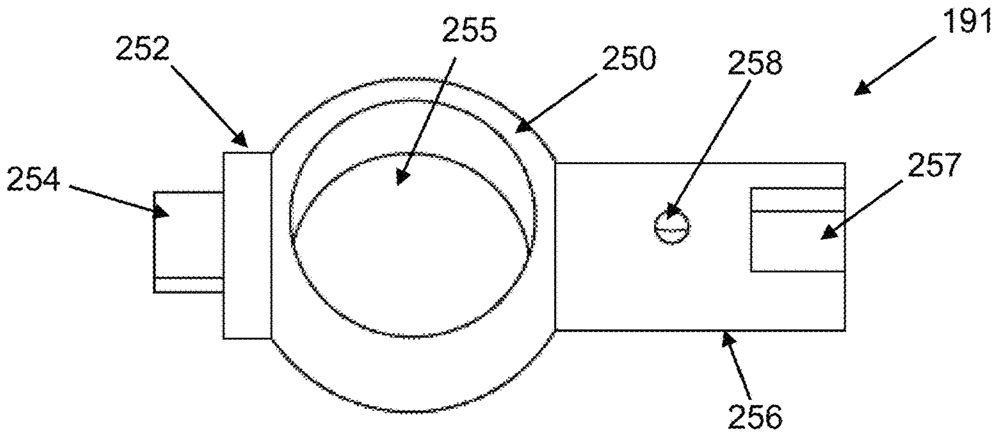
FIG. 15 is a left side view of a spindle according to embodiments of the present disclosure.
Figure 16:
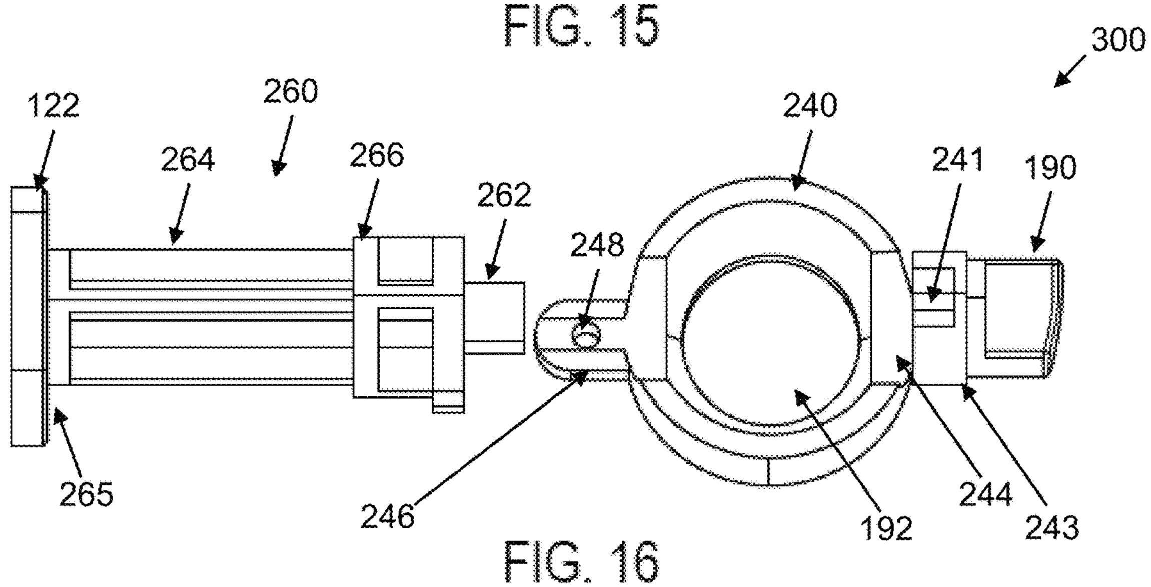
FIG. 16 is a right-side exploded view of knob, sleeve, connector and latch components according to embodiments of the present disclosure.
Figure 17:
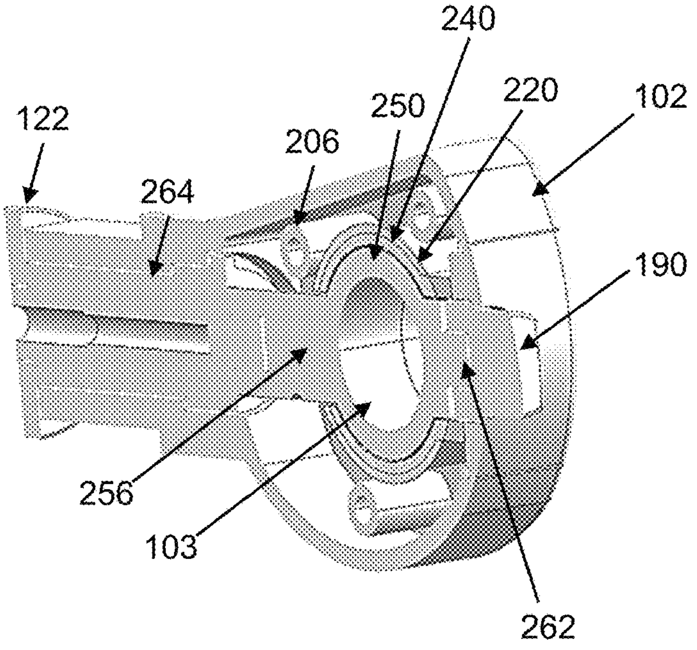
FIG. 17 is a perspective view in cross-section showing an assembled cylinder lock according to embodiments of the present disclosure.

In various embodiments as shown in FIGS. 15 through 17, the right-side case portion 212 is formed with a wall 220 having a partly spherically shaped interior 320 for securely receiving the partly spherically shaped head cradle 240 of the knob key assembly 300 and the partly spherically shaped head 250 of the spindle 191. When assembled, the partly spherically shaped head cradle 240 is in communication with the partly spherically shaped interior 320 of the wall 220 of the right-side case portion 212. Further, the head cradle 240 can rotate within the interior 320 of the wall 220. The right-side case portion 212 can further be formed with walls 216 extending from the wall 220, wherein the walls 216 form a pocket 218 that can receive the knob key shoulder 252 of the spindle 191 upon assembly of the cylinder lock 200. The knob key shoulder 252 can be formed with and extend from the head 250 of the spindle 191. In various embodiments, a knob key 254 is formed with and extends from the knob key shoulder 252. When assembled, the knob key 254 is positioned within a knob key slot 241 of the knob 190. As shown in FIG. 16, a knob key shoulder 243 (which is formed with the knob key slot 241) can be positioned within a gap 244 formed in the head cradle 240 of the knob key assembly 300. The head cradle 240 is formed with a latch arm 246, and the latch arm can be formed with an opening 248.

As shown in FIGS. 15 and 16, the head cradle 240 of the knob key assembly 300 is formed with an opening 192 and the head 250 is formed with an opening 255 to facilitate operations as described herein. The spindle 191 is formed with a neck 256 which is formed with a foot slot 257 and an opening 258. When assembled, the spindle neck opening 258 aligns with the latch arm opening 248 of the knob key assembly 300, permitting a pin or other joining element to connect with knob key assembly 300 with the spindle 191, whereupon rotation of the knob key assembly 300 rotates the spindle 191 within the partly spherically shaped wall 220 of the case portion 212 during operation. Such combined rotation can further be facilitated by a knob key leg 260 of the knob key assembly 300, where a knob key leg extension 262 is nested in the foot slot 257 of the spindle 191. In various embodiments, the knob key leg 260 is formed with a body 264 and a body extension 266, wherein the body extension 266 is integrally formed with the knob key leg extension 262. The locking element head 122 can be formed with or secured to an end 265 of the body 264 opposite the body extension 266, as shown in FIG. 16. In various embodiments, the knob key assembly 300 is integrally formed with the spindle 191 rather than being secured to the spindle 191.

Assembly of the embodiment of the cylinder lock 200 shown in FIGS. 12 through 17 can occur by inserting the knob key 254 of the spindle 191 into the knob key slot 241 of the knob 190, while aligning the latch arm opening 248 of the knob key assembly 300 with the spindle neck opening 258 of the spindle 191. The openings 248, 258 can permit a pin or other securing element to hold the knob key assembly 300 together with the spindle 191. The knob key shoulder 243 is maintained within the gap 244 of the head cradle 240 of the knob key assembly 300. The knob key leg extension 262 of the knob key assembly 300 is inserted into the foot slot 257 of the spindle 191 and forms a friction fit, in various embodiments. When assembled, the opening 255 in the head 250 of the spindle 191 and the opening 192 in the head cradle 240 of the knob key assembly 300 are aligned, permitting operations as described herein. Also, the partly spherically shaped head cradle 240 is nested within the partly spherically shaped head 250 when assembled.

After the spindle 191 and knob key assembly 300 are assembled, the left 210 and right-side 212 case portions of the cylinder lock case 215 can be fit together around the joined spindle 191 and knob key assembly 300, where the aligned openings 255 and 192 are permitted to rotate within the partly spherically shaped wall 220 of the right-side case portion 212. It will be appreciated that the male connector openings 206 in the right-side case portion 212 and/or the outer wall 209 of the left side case portion 210 are of sufficient height such that, when the left side 210 and right-side 212 case portions are joined, there is sufficient room for the partly spherically shaped head cradle 240 of the knob key assembly 230 and the partly spherically shaped head 250 of the spindle 191 to rotate. The spindle 191 is thus rotatably secured within the hollow interior of the cylinder lock case 215. The spindle 191 is rotatable about the axis defined by the axial opening in the cylinder lock case 215. Further, in embodiments where the spindle 191 and knob key assembly 300 are assembled together or are integrally formed, the spindle 191 and knob key assembly 300 are together rotatable about the axis defined by the axial opening in the cylinder lock case 215. The locking element head 122 extends outwardly of the extension component 110.

In operation, the locking element head 122 and the extension component 110 of the cylinder lock 200 can be inserted through an opening in a plate frame of a door latch as described elsewhere herein. Once inserted, the knob 190 can be rotated so as to rotate the locking element head 122 such that it cannot be removed from the backside of the plate frame without being rotated back to its initial point when it had been inserted. When the locking element head 122 is rotated to a locked position, the aligned openings 255 and 192 of the knob key assembly 300 and spindle 191 are also rotated to a position that further aligns with the opening 204 in the partly spherically shaped wall 220 of the right-side case portion 212 and the opening 103 in the cylinder lock case 215 of the cylinder lock 200. When so aligned, a shaft of a lock such as a padlock can be inserted through the overall opening 103, thereby preventing the knob 190 from rotating the locking element head 122 back to the position where it can be removed from the plate frame. Once the lock shaft is removed, the knob 190 can rotate the locking element head 122 back to a position where the cylinder lock 200 can be removed from a plate frame or other device to which it had been secured.

The present disclosure describes numerous embodiments, and these embodiments are presented for illustrative purposes only. These embodiments are described in sufficient detail to enable those skilled in the art to practice the embodiments, and it will be appreciated that other embodiments may be employed and that structural and other changes may be made without departing from the scope or spirit of the presently disclosed embodiments. Accordingly, those skilled in the art will recognize that embodiments of the present disclosure may be practiced with various modifications and alterations. Although particular features of the presently disclosed embodiments can be described with reference to one or more particular embodiments or figures that form a part of the present disclosure, and in which are shown, by way of illustration, specific embodiments, it will be appreciated that such features are not limited to usage in the one or more particular embodiments or figures with reference to which they are described. The present disclosure is thus neither a literal description of all embodiments nor a listing of features of any embodiments that must be present in all embodiments.

The invention claimed is:

1. A cylinder lock, comprising:

a cylinder lock case formed with a hollow interior, wherein the cylinder lock case comprises a knob end and a locking end;

a spindle rotatably secured within the hollow interior of the cylinder lock case; and a knob key assembly integrally formed with or secured to the spindle, wherein the knob key assembly comprises a knob positioned at least partially outwardly of the knob end of the cylinder lock case, wherein the knob key assembly further comprises a locking element positioned at least partially outwardly of the locking end of the cylinder lock case, wherein the cylinder lock case, the spindle and the knob key assembly are each formed with openings extending laterally therethrough, and wherein the spindle comprises a partly spherically shaped head comprising the opening extending laterally through the spindle, and wherein the knob key assembly comprises a partly spherically shaped head cradle comprising the opening extending laterally through the knob key assembly.

2. The cylinder lock of claim 1, wherein the knob key assembly is formed with an opening extending laterally therethrough.

3. The cylinder lock of claim 1, wherein the spindle is formed with an opening extending laterally therethrough.

4. The cylinder lock of claim 1, wherein the spindle opening and the knob key assembly opening are aligned and are separately alignable with the opening of the cylinder lock case upon rotation of the knob.

5. The cylinder lock of claim 1, wherein the partly spherically shaped head is nested within the partly spherically shaped head cradle.

6. The cylinder lock of claim 1, wherein the spindle is formed with a knob key and the knob of the knob key assembly is formed with a knob key slot for receiving the knob key.

7. The cylinder lock of claim 1, wherein the knob key assembly is formed with a knob key leg and a knob key leg extension, and wherein the spindle comprises a neck formed with a foot slot for receiving the knob key leg extension.

8. The cylinder lock of claim 7, wherein the neck of the spindle is formed with a neck opening, wherein the head of the knob key assembly comprises a latch arm formed with a latch arm opening, and wherein the neck opening is aligned with the latch arm opening.

9. A cylinder lock, comprising:

a cylinder lock case formed with an axial cavity extending therethrough along an axis, and further formed with a lateral opening extending therethrough, wherein the cylinder lock case comprises a knob end and a locking end;

a spindle secured within the cylinder lock case, wherein the spindle comprises a partly spherically shaped head comprising an opening extending laterally therethrough; and a knob key assembly integrally formed with or secured to the spindle, wherein the knob key assembly comprises a knob extending outwardly of the knob end of the cylinder lock case, wherein the knob key assembly further comprises a locking element extending outwardly of the locking end of the cylinder lock case, wherein the knob key assembly comprises a partly spherically shaped head cradle comprising an opening extending laterally therethrough, wherein the spindle and knob key assembly are rotatable about the axis of the cylinder lock case.

10. The cylinder lock of claim 9, wherein the spindle opening and the knob key assembly opening are aligned and are separately alignable with the opening of the cylinder lock case upon rotation about the axis.

11. The cylinder lock of claim 9, wherein the partly spherically shaped head is nested within the partly spherically shaped head cradle.

12. The cylinder lock of claim 9, wherein the spindle is formed with a knob key and the knob of the knob key assembly is formed with a knob key slot for receiving the knob key.

13. The cylinder lock of claim 9, wherein the knob key assembly is formed with a knob key leg and a knob key leg extension, and wherein the spindle comprises a neck formed with a foot slot for receiving the knob key leg extension.

14. The cylinder lock of claim 13, wherein the neck of the spindle is formed with a neck opening, wherein the head of the knob key assembly comprises a latch arm formed with a latch arm opening, and wherein the neck opening is aligned with the latch arm opening.

15. The cylinder lock of claim 9, wherein the cylinder lock case comprises a side case portion formed with a wall having a partly spherically shaped interior.

16. The cylinder lock of claim 15, wherein the knob key assembly comprises a partly spherically shaped head cradle in communication with the partly spherically shaped interior of the wall of the side case portion.

17. The cylinder lock of claim 16, wherein the spindle comprises a partly spherically shaped head, and wherein the partly spherically shaped head is nested within the partly spherically shaped head cradle.

18. A cylinder lock, comprising:

a cylinder lock case formed with an axial cavity extending therethrough along an axis, and further formed with a lateral opening extending therethrough, wherein the cylinder lock case comprises a knob end and a locking end, wherein the cylinder lock case comprises a side case portion formed with a wall having a partly spherically shaped interior;

a spindle secured within the cylinder lock case, wherein the spindle is formed with an opening extending laterally therethrough; and a knob key assembly integrally formed with or secured to the spindle, wherein the knob key assembly comprises a knob extending outwardly of the knob end of the cylinder lock case, wherein the knob key assembly further comprises a locking element extending outwardly of the locking end of the cylinder lock case, wherein the knob key assembly is formed with an opening extending laterally therethrough, wherein the spindle and knob key assembly are rotatable about the axis of the cylinder lock case.

* * * * *